United States Patent Office 3,600,377
Patented Aug. 17, 1971

3,600,377
MONOAZO DYES FOR NYLON
Hans Alfred Stingl, Brookside Heights, N.J., assignor to Toms River Chemical Corporation, Toms River, N.J.
No Drawing. Filed Jan. 16, 1968, Ser. No. 698,134
Int. Cl. C09b 29/16; D06p 1/02
U.S. Cl. 260—200                     3 Claims

ABSTRACT OF THE DISCLOSURE

Compounds of the formula

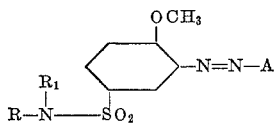

wherein A is a coupling component containing a sulfonic acid group and R and $R_1$ are hydrogen or alkyl groups of 2–6 carbon atoms with the proviso that only one of R and $R_1$ is hydrogen, provide yellow to red dyeings of good fastness properties and excellent leveling characteristics on synthetic polyamide fibers.

BACKGROUND OF THE INVENTION

The use of monoazo-dyestuffs containing a sulfonic acid group for the dyeing of animal fibers and artificial fibers of superpolyamides or superpolyurethanes is known. However, the dyeing of nylon presents particular problems in obtaining good leveling and the achievement of optimum leveling is a very important consideration in the dyeing or printing of nylon in order to cover up irregularities.

SUMMARY OF THE INVENTION

The present invention relates to and has for its objects the provision of dyestuffs particularly suited for the coloring of nylon fibers.

In accordance with the present invention it has been found that valuable dyeings are obtained on natural and synthetic fibers by the use as dyestuffs of monoazo-compounds of the formula

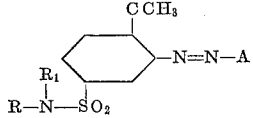

wherein A is the radical of a coupling component and R and $R_1$ are hydrogen or alkyl groups of 2–6 carbon atoms with the proviso that only one of R and $R_1$ is hydrogen. Preferably, however, R and $R_1$ are so selected that the combined number of carbon atoms in these groups is from 2 to 4 carbon atoms, that is, that $R+R_1=2-4$ carbon atoms.

Advantageously, the coupler is a member selected from the group consisting of 1-phenyl-3-methyl-5-pyrazolone monosulfonic acids, naphthol-, naphthylamine, and aminonaphthol-monosulfonic acids.

However, the coupling components used for making these dyestuffs may be any desired kind. They may owe their capacity for coupling, for example, to an aromatic grouping or to a reactive keto-methylene group.

As examples of coupling components suitable for making monoazo-dyestuffs by the present invention there may be mentioned:

Compounds of the naphthalene series

Hydroxynaphthalene monosulfonic acids such as 1-hydroxynaphthalene-4-sulfonic acid, 2-hydroxynaphthalene-8-sulfonic acid, 2-hydroxynaphthalene-6-sulfonic acid, aminonaphthalene monosulfonic acids such as 2:6-, 2:7- or 2:8-aminonaphthalenesulfonic acid, aminohydroxynaphthalene sulfonic acids such as 2:8:6-, or 2:6:8-aminohydroxynaphthalene sulfonic acid.

Pyrazolones 1-(3'- or 4'-sulfo)-phenyl-3-methyl-5-pyrazolone;
1-(2'-methyl-4'-sulfo)-phenyl-3-methyl-5-pyrazolone;
1-(2'-chloro-4'-sulfo)-phenyl-3-methyl-5-pyrazolone;
1-(2'-chloro-5'-sulfo)-phenyl-3-methyl-5-pyrazolone.

The coupling of the diazo-compounds may be carried out in an aqueous acid, neutral or alkaline medium, the most advantageous reaction conditions for coupling in any particular case depending to a great extent on the nature of the coupling component used.

These monoazo-dyestuffs containing a sulfonic acid group can be used for dyeing or printing a very wide variety of materials, principally for dyeing animal fibers such as leather, silk and especially wool and for dyeing artificial fibers of superpolyamides or superpolyurethanes. The dyeings obtainable therewith are distinguished by the purity and brightness of their tints, by good properties of fastness to alkali, light and washing and by good leveling properties.

The dyes of the present invention provide dyeings over a shade range from greenish yellow to bluish red.

The dyes will also dye well in combination, especially with the use of a leveling agent. If desired, a conventional after-treatment can be given to the dyed material.

The following examples illustrate the invention.

EXAMPLE 1

25.8 g. of ground N'-n-butyl-3-amino-4-methoxy-benzenesulfonamide are dissolved in a mixture of 75 g. of water and 25 g. of concentrated hydrochloric acid. The solution is brought to 0° C. with 75 g. of ice and diazotized by rapid addition of a solution of 7 g. of sodium nitrite in 20 g. of water. The diazo solution is clarified and gradually added to a stirred and iced solution of 25.4 g. of 3'-sulfo-1-phenyl-3-methyl-5-pyrazolone in 250 g. of water and 34 g. of soda ash. The yellow coupling product precipitates readily. It is filtered, washed with dilute brine, and dried. The product obtained is a yellow powder which dissolves in water and dyes nylon clear level shades of yellow.

EXAMPLE 2

The above described diazo solution of Example 1 is gradually combined with a stirred and iced solution of 29 g. of N-ethyl-N-(3'-sulfobenzyl-)aniline in 450 g. of water and 8 g. of soda ash, and 10 g. of soda ash are added to maintain a pH-value of about 6. The product is a golden yellow dyestuff with similar properties and can be isolated in the same manner.

EXAMPLE 3

A red dyestuff of comparable properties is obtained when the above diazo solution is freed of excess nitrous acid with 0.1 g. of aminosulfonic acid and gradually combined with a stirred and iced solution of 24 g. of 2-amino-8-naphthol-6-sulfonic acid in 400 g. of water and 4 g. of sodium hydroxide while maintaining a pH-range of 3.5 to 4.5 by the gradual addition of 25 g. of sodium acetate during 3 hours.

EXAMPLE 4

25.8 g. of ground N',N'-diethyl-3-amino-4-methoxy-benzene sulfonamide are dissolved in a mixture of 100 g. of water and 25 g. of concentrated hydrochloric acid. The solution is brought to 0° C. with 80 g. of ice and diazotized by rapid addition of a solution of 7 g. of sodium nitrite in 20 g. of water. The diazo solution is clarified and gradually added to a stirred and iced solution of 32.3 g. of 2′,5′-dichloro-4′-sulfo-1-phenyl-3-methyl-5-pyrazolone in 250 g. of water and 25 g. of soda ash. The reaction mixture is heated and the coupling product is precipitated by the addition of 35 g. of salt. It is filtered, washed with 5% brine, and dried. The yellow powder obtained dissolves in water and dyes nylon clear level shades of greenish-yellow.

EXAMPLE 5

0.5 g. of the dyestuff of Example 1, 5 g. of anhydrous sodium sulfate and 2.5 g. of ammonium sulfate are dissolved in 4000 g. of water. 100 g. of nylon fabric are entered at 40° C. The bath is heated to a boil during 30 minutes and maintained at the boil for 1 hour. The fabric is then removed from the bath, rinsed with water, and dried. It is dyed a bright shade of yellow having good leveling characteristics and good fastness properties.

I claim:
1. A compound of the formula

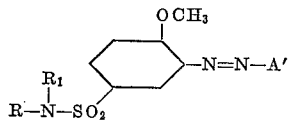

wherein A′ is selected from the group consisting of 1-hydroxy-4-sulfo-2-naphthyl, 2-hydroxy-8-sulfo-1-naphthyl, 2-hydroxy-6-sulfo-1-naphthyl, 2-amino-6-sulfo-1-naphthyl, 2-amino-7-sulfo-1-naphthyl, 2-amino-8-sulfo-1-naphthyl, 2-amino-8-hydroxy-6-sulfo-1-naphthyl, 2-amino-6-hydroxy-8-sulfo-1-naphthyl; and R and $R_1$ are hydrogen or alkyl groups of 2 to 6 carbon atoms with the proviso that only one of R and $R_1$ is hydrogen.

2. A compound according to claim 1 having the formula

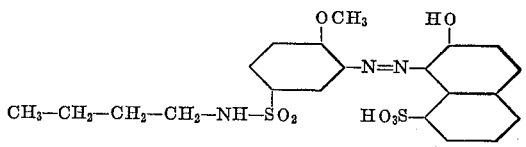

3. A compound according to claim 1 having the formula

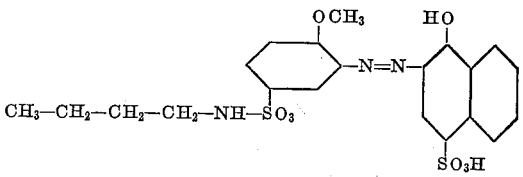

References Cited
UNITED STATES PATENTS 2,252,843  8/1941  Fischer _____ 260—200
3,012,843  12/1961  Gangneux et al. ____ 260—163X JOSEPH P. BRUST, Primary Examiner D. M. PAPUGA, Assistant Examiner U.S. Cl. X.R.

8—13, 54, 178; 260—163, 196, 197, 198

CERTIFICATE OF CORRECTION

Patent No. 3,600,377    Dated August 17, 1971

Inventor(s) HANS ALFRED STINGL

It is certified that error appears in the above-identified patent and that said Letters Patent are hereby corrected as shown below:

Column 4, claim 3, lines 13 through 19, amend the left hand side of the structural formula to read:

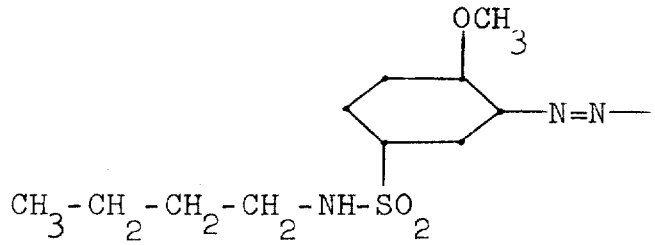

Signed and sealed this 9th day of January 1973.

(SEAL)
Attest:

EDWARD M. FLETCHER, JR.
Attesting Officer

ROBERT GOTTSCHALK
Commissioner of Patents jac